(12) United States Patent
Hosono

(10) Patent No.: US 7,120,452 B2
(45) Date of Patent: Oct. 10, 2006

(54) RADIO APPARATUS CAPABLE OF DETECTING ITS POSITION AND POSITION SEARCH METHOD

(75) Inventor: Shizu Hosono, Tokyo (JP)

(73) Assignee: NEC Corporation, Tokyo (JP)

( * ) Notice: Subject to any disclaimer, the term of this patent is extended or adjusted under 35 U.S.C. 154(b) by 421 days.

(21) Appl. No.: 10/086,826

(22) Filed: Mar. 4, 2002

(65) Prior Publication Data

US 2002/0123355 A1  Sep. 5, 2002

(30) Foreign Application Priority Data

Mar. 5, 2001  (JP)  ............................. 2001-060127

(51) Int. Cl.
*H04Q 7/20* (2006.01)
*G08G 1/123* (2006.01)
*G01C 21/26* (2006.01)

(52) U.S. Cl. .............................. 455/456.6; 455/456.1; 455/456.2; 455/456.3; 340/995.25; 340/991; 340/988; 701/214

(58) Field of Classification Search .. 455/456.1–456.4, 455/456.6, 414.2, 574; 340/995.25, 991, 340/988; 701/214
See application file for complete search history.

(56) References Cited

U.S. PATENT DOCUMENTS

| | | | |
|---|---|---|---|
| 6,259,921 B1 * | 7/2001 | Totaro et al. ................ 455/445 |
| 6,311,069 B1 * | 10/2001 | Havinis et al. ........... 455/456.4 |
| 6,345,180 B1 * | 2/2002 | Reichelt ................... 455/404.1 |
| 6,347,278 B1 * | 2/2002 | Ito ............................. 701/200 |
| 6,356,841 B1 * | 3/2002 | Hamrick et al. ............. 701/213 |
| 6,393,292 B1 * | 5/2002 | Lin .......................... 455/456.5 |
| 6,453,168 B1 * | 9/2002 | McCrady et al. ........... 455/517 |
| 6,505,048 B1 * | 1/2003 | Moles et al. .............. 455/456.1 |
| 6,516,190 B1 * | 2/2003 | Linkola ....................... 455/408 |
| 6,546,258 B1 * | 4/2003 | Nohara et al. ........... 455/456.1 |
| 6,643,517 B1 * | 11/2003 | Steer ....................... 455/456.4 |
| 6,757,545 B1 * | 6/2004 | Nowak et al. ........... 455/456.2 |
| 6,768,909 B1 * | 7/2004 | Irvin ....................... 455/456.1 |
| 2002/0042277 A1 * | 4/2002 | Smith ......................... 455/456 |
| 2002/0077116 A1 * | 6/2002 | Havinis et al. ............. 455/456 |

FOREIGN PATENT DOCUMENTS

JP    9-178833 A    7/1997
WO   WO 00/03555 A1   1/2000

* cited by examiner

*Primary Examiner*—Charles Appiah
*Assistant Examiner*—Un C. Cho
(74) *Attorney, Agent, or Firm*—Sughrue Mion, PLLC

(57) ABSTRACT

When receiving an incoming call, a portable telephone that receives a search request judges whether or not this incoming call is the search request sent from a second portable telephone, which is a source of the search request. When the portable telephone judges that the incoming call is the search request sent from the second portable telephone, it is judged whether or not the receiving portable telephone is capable of determining its position information. When the portable telephone is incapable of determining its position information, the portable telephone automatically switches to a response hold state and transmits a search response message to the second portable telephone based on information stored in advance. Further, when the portable telephone is capable of determining its position information, the portable telephone determines its position information and transmits the position information to the portable telephone.

32 Claims, 3 Drawing Sheets

SOURCE OF SEARCH REQUEST        DESTINATION OF SEARCH REQUEST

RADIO APPARATUS CAPABLE OF DETECTING ITS POSITION AND POSITION SEARCH METHOD

BACKGROUND OF THE INVENTION

1. Field of the Invention

The present invention relates to a radio apparatus that detects the position of the radio apparatus and transmits the position information to a search requester. The present invention also relates to a position search system and a position search method using such an apparatus.

2. Description of the Related Art

In recent years, various systems have been developed that use a portable telephone capable of determining its own position information. For example, there is a position search system in which, when a portable telephone receives a search request from a third party, the portable telephone determines its position information and transmits the position information to the third party.

FIG. 1 is a flowchart showing the operation of such a portable telephone. In FIG. 1, when the portable telephone (which is the destination of the search request) gets an incoming call (S11), the portable telephone performs an incoming call response regardless of the content of the incoming call (S12). Next, the portable telephone determines whether or not the source of the incoming call will receive the results of the search request sent from the third party, e.g., another portable telephone which is the source of the search request (S13). When the portable telephone determines that the source of the incoming call will not receive the results of the search request, the portable telephone performs a normal incoming call processing (S14). On the other hand, if the portable telephone determines that the incoming call will be receiving the results of the search request, the positioning mechanism provided in the portable telephone judges whether the portable telephone is capable of determining its position information (S15). When the positioning mechanism judges that the portable telephone is incapable of determining its position information, the portable telephone completes the operation without transmitting any position information to the portable telephone that is the source of the search request (S16). On the other hand, when the positioning mechanism judges that the portable telephone is capable of determining its position information, the portable telephone checks received information regarding the portable telephone that is the source of the search request (S17) and performs determines its position information (S18). The position information is then transmitted to the portable telephone that is the source of the search request (S19).

However, in the above-described position detecting system, when the portable telephone receives a search request from a third party when it is incapable of determining its position information, the portable telephone cannot transmit the position information to the third party because the portable telephone cannot determine its position information. Therefore, when the third party does not get a response to the search request, the third party is unaware of the reason, e.g., the portable telephone did not receive the search request sent by the third party, the portable telephone is incapable of determining its position information, the portable telephone rejected the incoming call of the search request, or the portable telephone rejects determining its position information.

SUMMARY OF THE INVENTION

Accordingly, an aspect of the present invention is to provide a radio apparatus capable of informing the search requester of the reason for not responding to the search request even when the radio apparatus receives the search request from the search requester in the situation where the radio apparatus is incapable of determining its position information.

To achieve the above aspect, a radio apparatus of the present invention comprises a receiving means for receiving a radio signal, a judging means for judging whether the radio apparatus is capable of determining its position information and a setting means for setting a response hold state when the radio apparatus is incapable of determining its position information. The radio apparatus further comprises a sending means that sends a message to a sender of the radio signal. The radio apparatus may further comprise a checking means that checks if the radio signal includes the information showing a search request for position information. Preferably, the radio apparatus comprises a storing means that stores in advance a message for each search request sender. In addition, the setting means sets a response hold state and the sending means sends the message even if the radio apparatus is capable of determining its position information. The radio apparatus further comprises a positioning means for determining its position information and a sending means that send the result of the positioning means to a sender of the radio signal. Preferably, the message shows that the radio apparatus is incapable of determining its position information. The message may show that the radio apparatus rejects determining its position information. The message may be the latest positioning data of a plurality of positioning data. Moreover, the message may be the position information of a base station located nearest to the radio apparatus. Prefereably, the radio apparatus is a portable telephone.

Another aspect of the invention provides a position search system that comprises a first radio apparatus and a second apparatus. The first radio apparatus comprises a receiving means that receives a radio signal from the second radio apparatus, a judging means that judges whether the first radio apparatus is capable of determining its position information and setting means that sets a response hold state when the first radio apparatus is incapable of determining its position information. The first radio apparatus further comprises a sending means that sends a message to the second radio apparatus. The first radio apparatus may further comprise a checking means that checks whether the radio signal includes the information showing a search request of position information. The first radio apparatus further comprises a storing means for storing the message previously determined on the basis of the second radio apparatus. The first radio apparatus sets a response hold state and sends the message to the second radio apparatus even if the first radio apparatus is capable of determining its position information. The first radio apparatus further comprises a positioning means that determines is position information and a sending means that sends the result of the positioning means to the second radio apparatus. The sent message may show that the first radio apparatus is incapable of determining its position information. The sent message may also show that the first radio apparatus rejects determining its position information. The content of the message is preferably the latest positioning data from a plurality of positioning data. The sent message may also be the position information of a base station located nearest to the first radio apparatus. At least one of the first radio apparatus and the second radio apparatus is a portable telephone, and both can be portable telephones.

Another aspect of the present invention provides a position search method for searching a position of a radio apparatus. The method comprises receiving a radio signal, judging whether the radio apparatus is capable of determining its position information and moving to a response hold state when the radio apparatus is incapable of determining its position information. The position search method further comprises sending a message to a sender of the radio signal. The position search method may comprise checking whether the radio signal includes the information showing a search request of position information. Preferably, the position search method comprises storing the message for each of the senders. The position search method may further comprise moving to a response hold state when the radio apparatus is capable of determining its position information and sending a message to a sender of the radio signal. Moreover, the position search method comprises determining the position information of the radio apparatus and sending the positioning result to a sender of the radio signal. The radio apparatus is preferably a portable telephone.

In the present invention, when the radio apparatus which receives a search request from the third party in the situation where the radio apparatus is incapable of determining its position information, the radio apparatus automatically switches to a response hold state and transmits information showing that the radio apparatus is unable to determine its position information, or a similar message, to the search requester as a search response message. Therefore, the search requester is consistently able to obtain some information even when the radio apparatus that is the destination of the search request is unable to determine its position information.

BRIEF DESCRIPTION OF THE DRAWINGS

These and other aspects, features and advantages of the invention will become more fully apparent from the following detailed description taken in conjunction with accompanying drawings.

DETAILED DESCRIPTION OF THE INVENTION

Hereinafter, an exemplary embodiment of the present invention will be described in detail with reference to the drawings.

Figure 1:
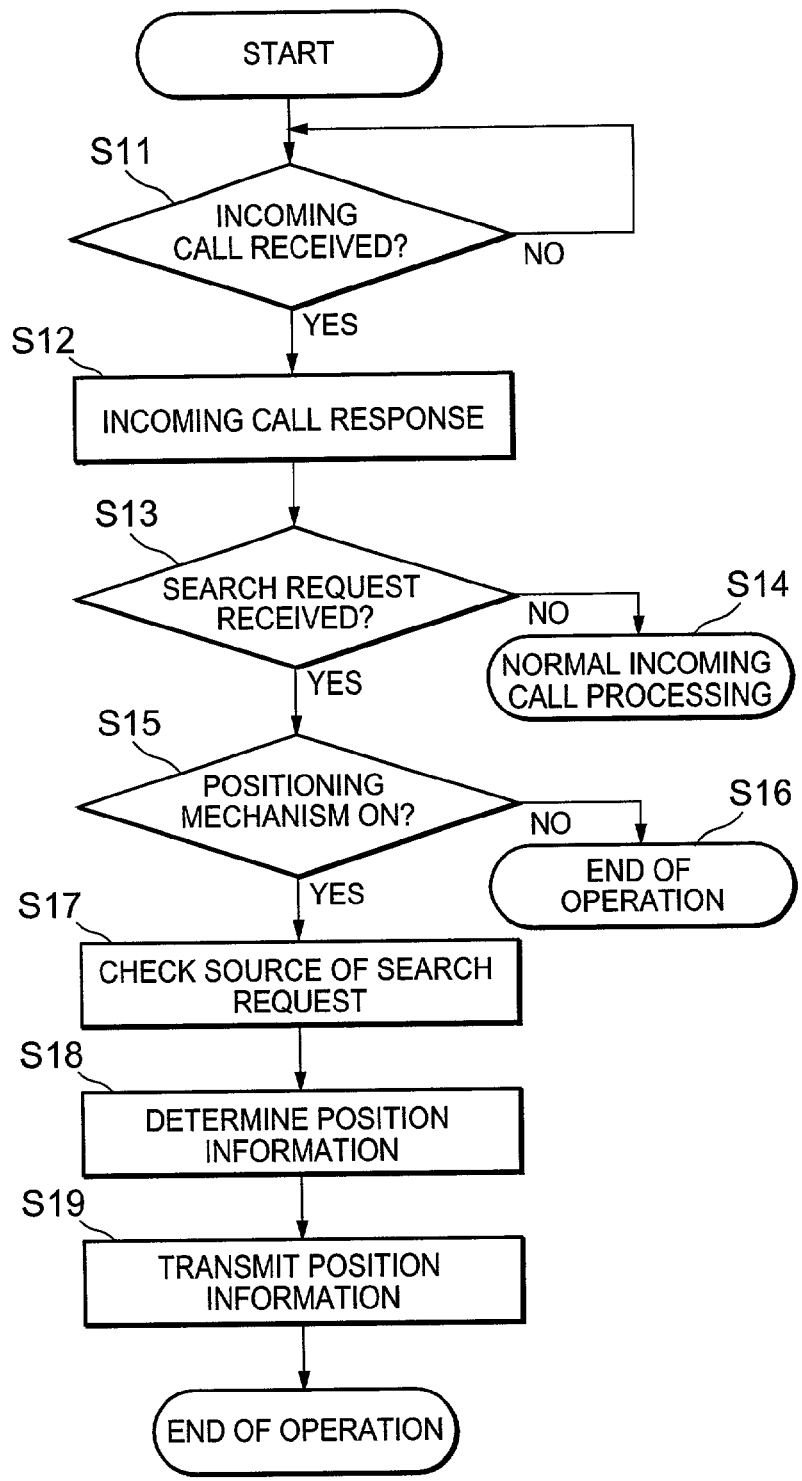
FIG. 1 is a flowchart showing an operation of a portable telephone related to the present invention.
Figure 2:
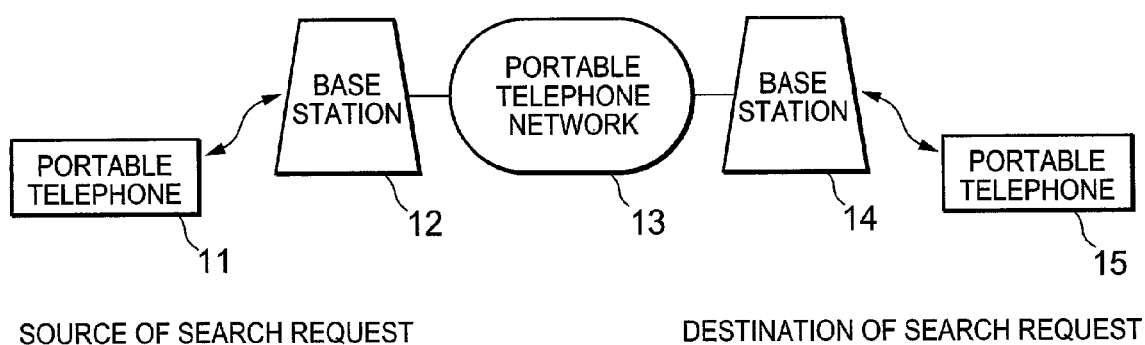
FIG. 2 shows an exemplary embodiment of a position detecting system of the present invention.

FIG. 2 shows an exemplary embodiment of a position detecting system of the present invention. As shown in FIG. 2, the present invention is comprised of a radio apparatus, preferably a portable telephone 11 which is a first portable telephone, a portable telephone 15 which is a second portable telephone, a base station 12, a portable telephone network 13 and a base station 14. The portable telephone 11 is a source of a search request and transmits a search request to the portable telephone 15 in order to obtain the position information of the portable telephone 15. This search request is sent out into the portable telephone network 13 via the base station 12 and arrives at the portable telephone 15 via the base station 14 located near the portable telephone 15. When the portable telephone 15 (the destination of the search request) is capable of determining its position information and receives the search request sent from the portable telephone 11 (the source of the search request), the portable telephone 15 transmits a search result corresponding to the search request to the portable telephone 11. The search result is sent out into the portable telephone network 13 via the base station 14 and arrives at the portable telephone 11 via the base station 12 located near the portable telephone 11.

Figure 3:
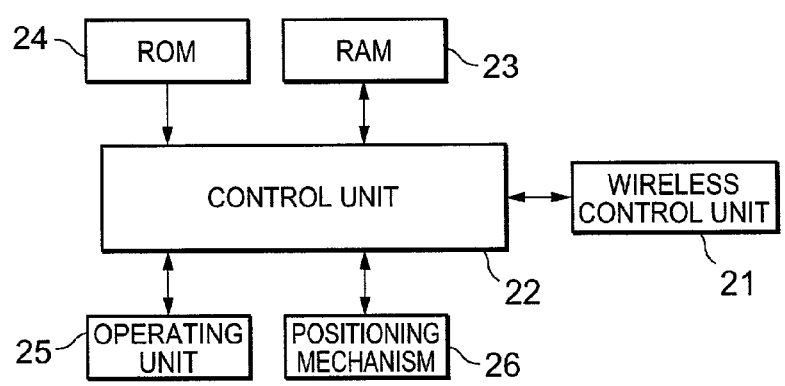
FIG. 3 is a block diagram showing an exemplary construction of the portable telephone 15 in FIG. 2.

FIG. 3 is a block diagram showing an exemplary construction of the portable telephone 15 that receives the search request shown in FIG. 2. As shown in FIG. 3, the portable telephone 15 comprises a wireless control unit 21 for receiving the search request and a RAM 23, which is a memory area for storing in advance an identification of the portable telephone 11 used by the search requester or the information sent from the portable telephone 11 that corresponds to the search request. The portable telephone 15 further comprises a ROM 24 that is a program area for recording a control program, and an operating unit 25 for operating the portable telephone 15. The portable telephone 15 further comprises a positioning mechanism 26 for determining the position information of the portable telephone 15, and a control unit 22 for controlling the wireless control unit 21, the RAM 23, the ROM 24, the operating unit 25 and the positioning mechanism 26.

In the present invention, a plurality of portable telephones, each of which is a potential source of a search request, may be configured. When a plurality of portable telephones are used, the RAM 23 of the portable telephone receiving the search request stores information such as identification numbers of the requesting portable telephones or the information sent from the receiving portable telephone that corresponds to the search request from each of the requesting portable telephones, i.e., the sources of the search requests.

Figure 4:
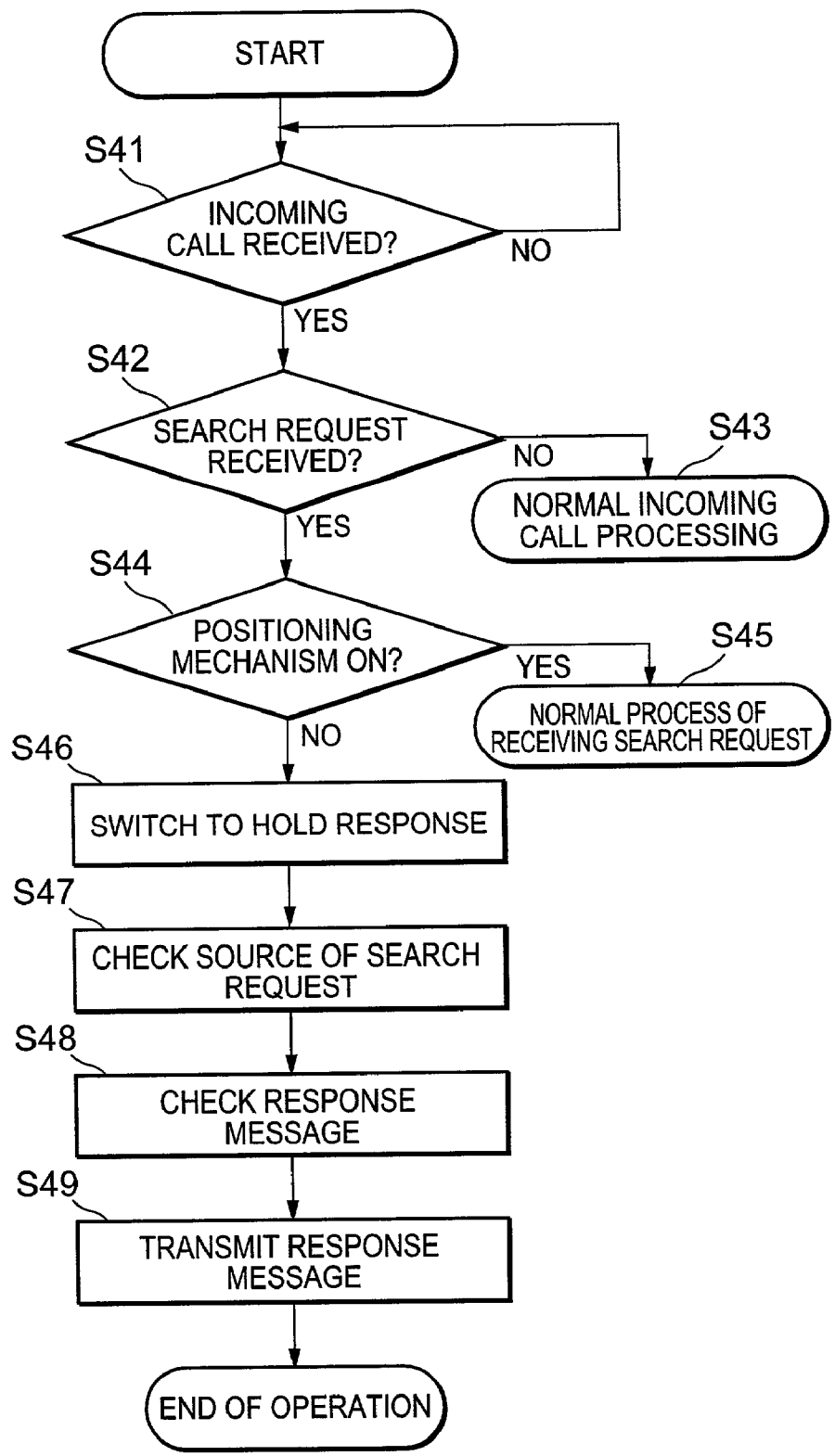
FIG. 4 is a flowchart showing an operation of a portable telephone of the present invention.

The operations of the portable telephone 15, which receives the search request in the position detecting system shown in FIG. 2 and configured as described above, will be described below with reference to FIG. 4. In FIG. 4, when the wireless control unit 21 receives an incoming call (S41), the portable telephone 15 judges whether the incoming call is a search request sent from the portable telephone 11 or not (S42). When the portable telephone 15 judges that this incoming call is a search request sent from the portable telephone 11, the portable telephone 15 performs the normal incoming call processing (S43). On the other hand, when the portable telephone 15 judges that the incoming call is a search request sent from the portable telephone 11, the positioning mechanism 26 judges whether the portable telephone is in the situation capable of determining its position information or not (S44). When the positioning mechanism 26 judges that the portable telephone 15 is capable of determining its position information, the normal processing for receiving the search request is performed (S45), such as the positioning mechanism 26 determining the position information and the transmission of the position information to the requesting portable telephone 11. On the other hand, when the positioning mechanism 26 judges that the portable telephone 15 is incapable of determining its position information, the portable telephone 15 automatically switches to a response hold state without sending the incoming call response (S46). Next, the portable telephone 15 checks the identification information of the requesting portable telephone 11 (S47). The information for responding, stored in advance in the RAM 23, is read out based on the identification of the requesting portable telephone (S48). The portable telephone 15 transmits the search response message to the portable telephone 11 based on the response information being read out from the RAM 23 (S49).

For example, the search response messages transmitted to the portable telephone 11 may state "incapable of determining position information" or "rejecting the search request". When the positioning data is periodically stored in the RAM 23 or another storage device, the latest positioning data at the time of receipt the search request may be sent as the search response message. Alternatively, in order to indicate the approximate position of the portable telephone 15, the position information of the closest base station at the time of receipt the search request may be sent as the search response message.

In the exemplary embodiment, the portable telephone 15 automatically switches to the response hold state and sends the search response message while the portable telephone 15 is incapable determining its position information. However, even when the portable telephone 15 is capable of determining its position information, the portable telephone 15 may automatically switch to the response hold state and send the search response message, depending on the information previously stored in RAM 23 corresponding to each of the portable telephones that sent a search request. In this case, after the portable telephone 15 receives the search request sent from the requesting portable telephone and confirms that the portable telephone 15 is capable of determining its position information, the portable telephone 15 reads out the response information previously stored in the RAM 23 and sends the information to the requesting portable telephone. Thus, even in the situation where the portable telephone is capable of determining its position information, the portable telephone can automatically switch to the response hold state, depending on the response information stored for each of the portable telephones that send search requests. The search response messages sent when the portable telephone is capable of determining its position information are preferably the same as those messages sent when the portable telephone is incapable of determining its position information.

In the exemplary embodiment, the portable telephone, which receives the search request, automatically switches to the response hold state without sending the incoming call response to the search request. However, the portable telephone, which receives the search request, may perform the incoming call response to the search request and thereafter automatically switches to the response hold state. Users can select whether the portable telephone switches to the response hold state without sending the incoming call response to the search request or the portable telephone switches to the response hold state after sending the incoming call response to the search request.

Since the present invention is constructed as described above, the present invention can obtain effects as described below.

In the case where the portable telephone receives the search request from the search requester and the portable telephone is incapable of determining its position information, the portable telephone automatically switches to the response hold state and transmits the search response message to the search requester. Therefore, even when the portable telephone is incapable of determining its position information, the search requester can consistently obtain some information. This avoids the inconvenience of not obtaining any response to the search request or having to wait for several hours due to no response to the search request.

The portable telephone which receives the search request previously stores response information corresponding to the search request from each of the search requesters. Therefore, the portable telephone can send different information or different response messages to each of the portable telephones that send a search request.

When a portable telephone receives the search request and the position information of the closest base station at the time of receipt the search request is sent as the search response message, the search requester can obtain the information of the area where the portable telephone receiving the search request is located, even when the receiving portable telephone cannot determine its position information.

Since the latest positioning data is accumulated and stored, and thereafter is sent as the search response message, the search requester can obtain the information of the approximate position of the receiving portable telephone even when the receiving portable telephone cannot determine its position information.

In the portable telephone that receives a search request, users can select whether the portable telephone switches to the response hold state without sending the incoming call response to the search request or the portable telephone switches to the response hold state after sending the incoming call response to the search request. Therefore, the users of the portable telephone that receives the search request avoid the inconvenience of always performing the incoming call response.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A radio apparatus comprising:
   positioning means for determining a position of said radio apparatus;
   receiving means for receiving a radio signal;
   checking means for checking whether said radio signal includes a search request requesting the position of said radio apparatus;
   judging means for judging whether said apparatus can determine its position;
   sending means for sending a message to a sender of said radio signal in response to said search request if said judging means judges that said apparatus cannot determine its position;
   wherein said message comprises the position of a base station located nearest to said radio apparatus;
   said radio apparatus further comprising storing means for storing said message;
   setting means for setting a response hold state if said judging means determines that said radio apparatus cannot determine its position;
   identification means for checking the identification of the sender of said radio signal after said response hold state is set; and
   reading means for reading the message stored in said storing means after said response hold state is set;
   wherein after said message is read from said storing means, said response hold state ends and said sending means sends said message.

2. The radio apparatus as claimed in claim 1, wherein said setting means sets said response hold state even if said judging means determines that said radio apparatus can determine its position.

3. The radio apparatus as claimed in claim 1, wherein said sending means sends said message even if said radio apparatus can determine its position.

4. The radio apparatus as claimed in claim 1, wherein said message further comprises an indication that said radio apparatus cannot determine its position.

5. The radio apparatus as claimed in claim 1, wherein said message further comprises an indication that said radio apparatus rejects said request for its position.

6. The radio apparatus as claimed in claim 1, wherein said radio apparatus is a portable telephone.

7. The radio apparatus as claimed in claim 1, wherein said radio apparatus receives radio signals from a plurality of senders, and said storing means stores a message for each one of the plurality of senders.

8. The radio apparatus as claimed in claim 7, wherein at least one message stored in said storing means is different from another message stored in said storing means.

9. A radio apparatus comprising:
   a receiver that receives a radio signal;
   a receiver controller that checks whether said radio signal includes a search request requesting the position of said radio apparatus;
   a positioning mechanism that judges whether said apparatus can determine its position and, if possible, determines the position of said radio apparatus;
   a transmitter that sends a message to a sender of said radio signal in response to said search request if said position mechanism determines that said apparatus cannot determine is position information;
   wherein said message comprises the position of a base station located nearest to said radio apparatus;
   further comprising a memory that stores said message;
   a controller that sets a response hold state if said positioning mechanism judges that said radio apparatus cannot determine its position;
   identification means that checks the identification information of the sender of said radio signal after said response hold state is set; and
   reading means that reads the message stored in said memory after said response hold state is set;
   wherein after said message is read from said storing means, said response hold state ends and said transmitter sends said message.

10. The radio apparatus as claimed in claim 9, wherein said controller sets said response hold state even if said positioning mechanism judges that said radio apparatus can determine its position.

11. The radio apparatus as claimed in claim 9, wherein said transmitter sends said message even if said radio apparatus can determine its position.

12. The radio apparatus as claimed in claim 9, wherein:
   if said positioning mechanism judges that said apparatus can determine its position, said positioning mechanism also determines the position of said radio apparatus; and
   said transmitter sends said position to said sender of said radio signal.

13. The radio apparatus as claimed in claim 9, wherein said message further comprises an indication that said apparatus cannot determine its position.

14. The radio apparatus as claimed in claim 9, wherein said message further comprises an indication that said apparatus rejects said request to for its position.

15. The radio apparatus as claimed in claim 9, wherein said radio apparatus is a portable telephone.

16. The radio apparatus as claimed in claim 9, wherein said radio apparatus receives radio signals from a plurality of senders, and said memory stores a message for each one of the plurality of senders.

17. The radio apparatus as claimed in claim 16, wherein at least one message stored in said storing means is different from another message stored in said storing means.

18. A position search system including a first radio apparatus and a second radio apparatus, wherein said first radio apparatus comprises:
   positioning means for said first radio apparatus to determine its position;
   receiving means for receiving a radio signal from said second radio apparatus;
   judging means for judging whether said first radio apparatus can determine its position;
   checking means for checking whether said radio signal includes a search request requesting the position of said first radio apparatus;
   sending means for sending a message to said second radio apparatus in response to said search request if said judging means judges that said first radio apparatus cannot determine its position;
   wherein said message comprises the position of a base station located nearest to said radio apparatus;
   wherein said first radio apparatus further comprises storing means for storing said message;
   setting means for setting a response hold state if said judging means determines that said first radio apparatus cannot determine its position;
   identification means for checking the identification information of the sender of said radio signal after said response hold state is set; and
   reading means for reading the message stored in said storing means after said response hold state is set;
   wherein after said message is read from said storing means, said response hold state ends and said sending means sends said message.

19. The position search system as claimed in claim 18, wherein said setting means sets said response hold state even if said judging means determines that said first radio apparatus can determine its position.

20. The position search system as claimed in claim 18, wherein said first radio apparatus sends said message to said second radio apparatus even if said first radio apparatus can determine its position.

21. The position search system as claimed in claim 18, wherein if said judging means judges that said first radio apparatus can determine its position, said sending means sends said position determined by said positioning means to said second radio apparatus.

22. The position search system as claimed in claim 18, wherein said message further comprises an indication that said first radio apparatus cannot determine its position.

23. The position search system as claimed in claim 18, wherein said message further comprises an indication that said first radio apparatus rejects said request for its position.

24. The position search system as claimed in claim 18, at least one of said first radio apparatus and said second radio apparatus are portable telephones.

25. The radio apparatus as claimed in claim 18, wherein said radio apparatus receives radio signals from a plurality of senders, and said storing means stores a message for each one of the plurality of senders.

26. The radio apparatus as claimed in claim 25, wherein at least one message stored in said storing means is different from another message stored in said storing means.

27. A position search method for searching a position of a radio apparatus, said method comprises:
   receiving a radio signal;
   judging whether said radio apparatus can determine its position;
   checking whether said radio signal includes a search request requesting the position of said radio apparatus;
   sending a message to a sender of said radio signal in response to said search request if said radio apparatus cannot determine its position;
   wherein said message comprises the position of a base station located nearest to said radio apparatus;
   wherein said position search method further comprises storing said message;
   setting a response hold state if it is judged that said radio apparatus cannot determine its position;
   checking the identification information of the sender of said radio signal after said response hold state is set; and
   reading the stored message after said response hold state is set;
   ending said response hold state after said stored message is read and sending said message.

28. The position search method as claimed in claim 27, wherein said response hold state is set even if it is judged that said radio apparatus can determine its position.

29. The position search method as claimed in claim 27, wherein said method further comprises:
   sending said message even when said radio apparatus can determine its position.

30. The position search method as claimed in claim 27, wherein said radio apparatus is a portable telephone.

31. The radio apparatus as claimed in claim 27, wherein said radio apparatus receives radio signals from a plurality of senders, and said storing means stores a message for each one of the plurality of senders.

32. The radio apparatus as claimed in claim 31, wherein at least one message stored in said storing means is different from another message stored in said storing means.

* * * * *